United States Patent [19]
Gerber

[11] 3,767,295
[45] Oct. 23, 1973

[54] AUTOMATIC LENS CHANGER
[76] Inventor: Lewis Gerber, Salt Lake City, Utah
[22] Filed: July 3, 1972
[21] Appl. No.: 268,685

[52] U.S. Cl. .................. 352/79, 352/80, 352/92, 352/142, 352/221
[51] Int. Cl. .......................................... G03b 41/00
[58] Field of Search ................ 352/79, 80, 92, 142

[56] References Cited
UNITED STATES PATENTS

| 3,685,890 | 8/1972 | Sekera | 352/79 |
| 3,515,474 | 6/1970 | Solow | 352/92 |
| 1,040,591 | 10/1912 | Thomas | 352/79 |
| 2,073,627 | 3/1937 | Draeger | 352/79 |
| 2,113,580 | 4/1938 | Draeger | 352/80 |

FOREIGN PATENTS OR APPLICATIONS

| 903,302 | 8/1962 | Great Britain | 352/142 |
| 1,093,202 | 11/1960 | Germany | 352/79 |

Primary Examiner—Samuel S. Matthews
Assistant Examiner—Russell E. Adams, Jr.
Attorney—Robert M. Angus et al.

[57] ABSTRACT

A rotatable turret carrying first and second lenses is mounted forwardly of a projection lamp of a cinematographic projector. The turret is rotatable between first and second angular positions to selectively position the first or second lens in the optical path of the projection lamp. Drive means is provided for rotating the turret between its first and second positions, and sense means is provided for operating the drive means. The sense means is operable upon a change of format contained on the film carried by the projector, the classes of format being characterized by different frame sizes. Preferably, variable aperture apparatus is responsive to a change in the angular position of the turret to alter the size of the projection aperture in accordance with the frame size of the film format.

8 Claims, 11 Drawing Figures

PATENTED OCT 23 1973

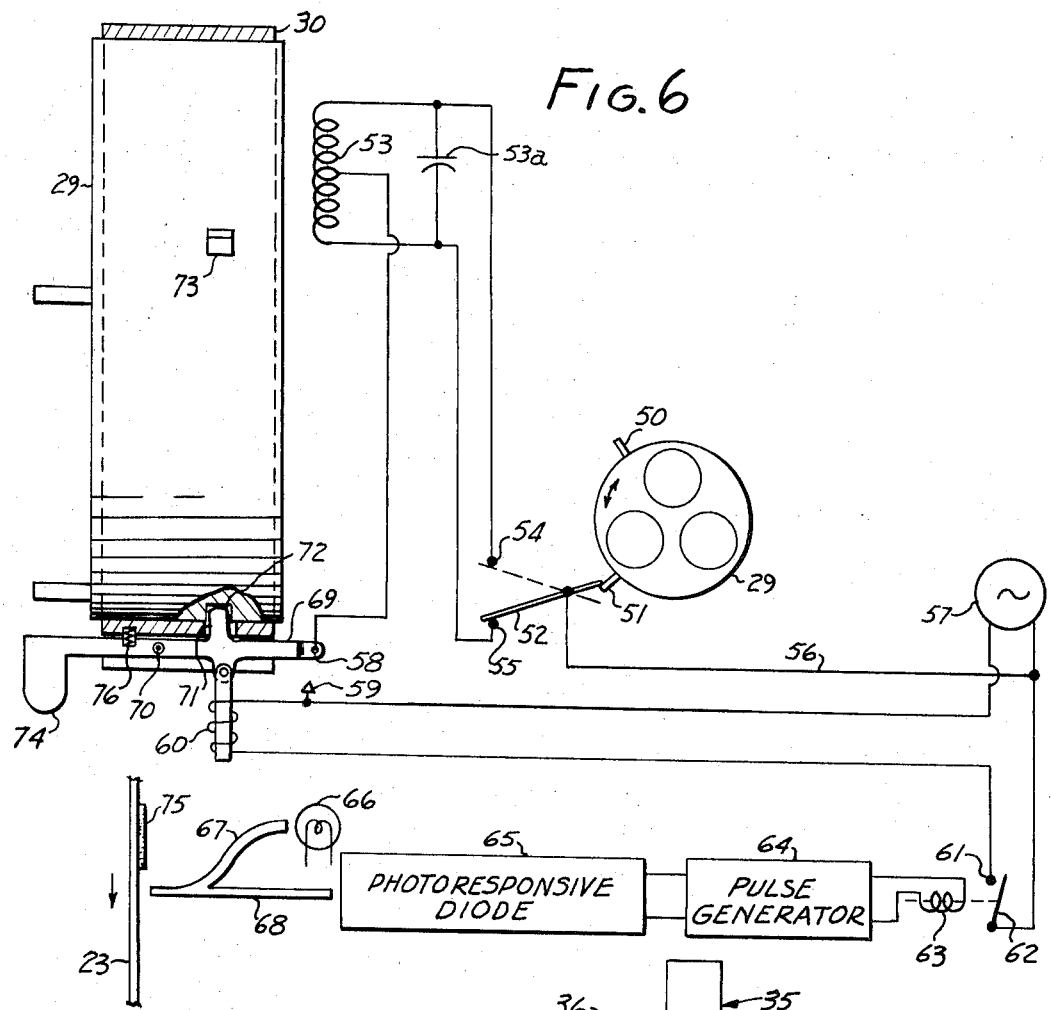
FIG. 6
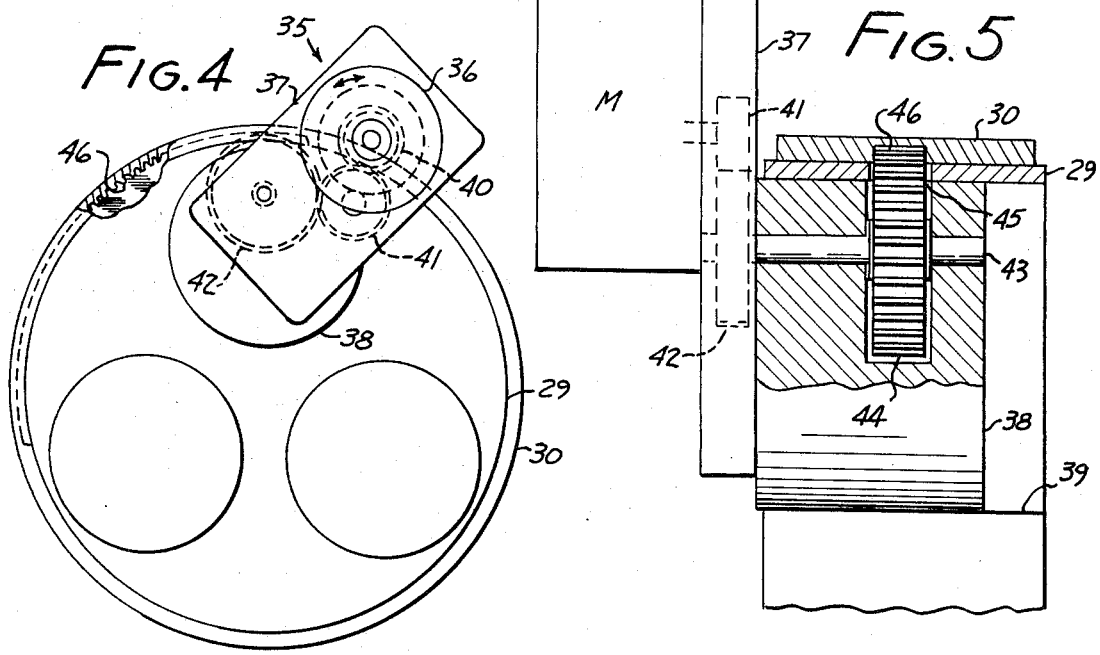
FIG. 4
FIG. 5

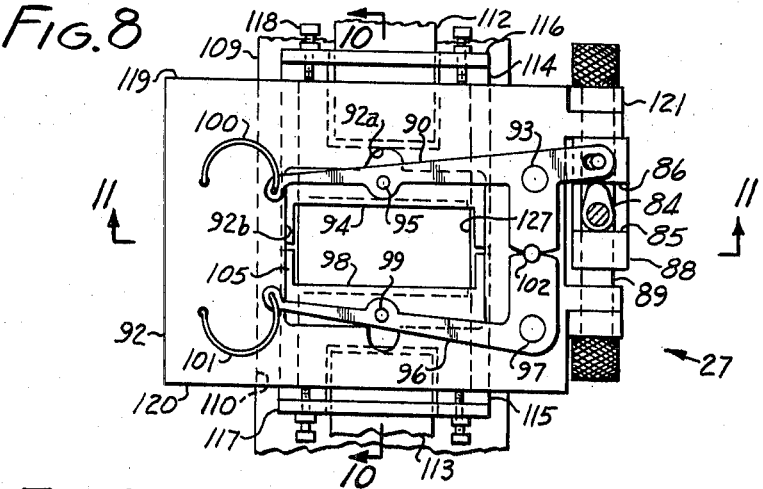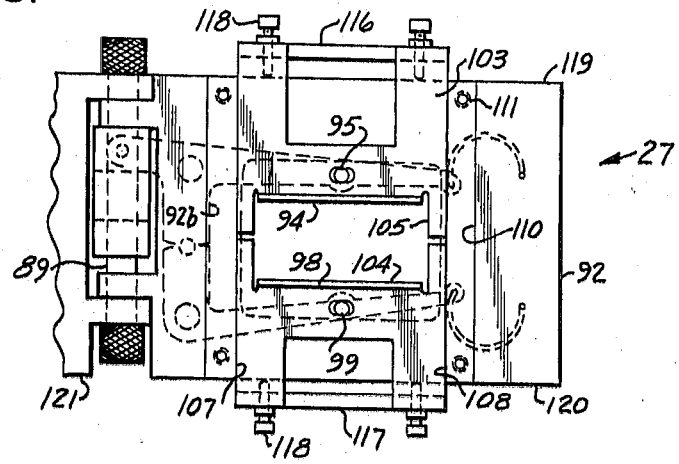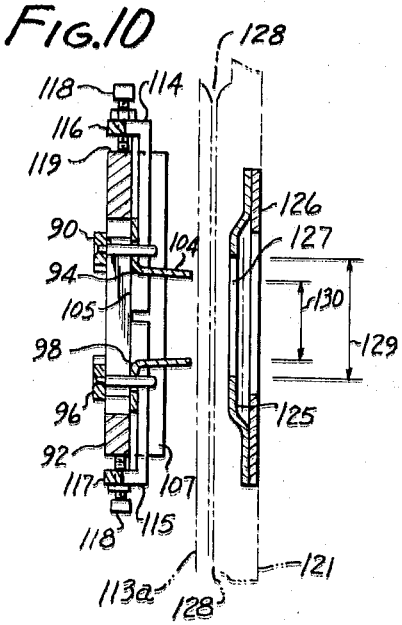

AUTOMATIC LENS CHANGER

This invention relates to automatic lens changers for cinematographic film projectors.

In commercial film projection, there are two standard classes of film format compatible with 35 mm film. These classes are the class known as "Wide-screen" in which the width-to-height ratio of the image size is 1.85 to 1, and "Cinemascope" in which the width-to-height ratio of the image size is 2.35 to 1. Ordinarily, commercial projection theaters have apparatus for projection of both Wide-screen and Cinemascope program material. Some theaters mix the program material so that material of one format may be projected at one time and material of another format may suceed the first. Ordinarily, when a film strip containing both classes of program material reaches the end of one class, the operator must manually readjust the aperture size of the projector for the changed projection dimensions, and must substitute a new projection lens compatible with the next class of program material. Heretofore, projectors capable of projecting both Wide-screen and Cinemascope formats have included removable projection aperture plates sized to the respective formats so that the operator may select the appropriate projection aperture plate for the particular format. Such projectors also have included appropriate lens mounted to a turret in such a manner as to selectively position the appropriate lens in the optical path of the image. Thus, at the end of each strip of film containing one format of program material, the operator would change the projection aperture plate for the next format of program material, and would rotate the lens turret to position the proper lens for projection.

It is an object of the present invention to provide apparatus to automatically change the lens and projection aperture of a projector upon a change of format of a film strip.

It is another object of the present invention to provide adjustable projection aperture apparatus for automatically changing the size of a projection aperture when the lens of such projector is changed, such as upon a change of film format.

In accordance with the present invention, sense means is provided for sensing the location of a change of format on a film, such as from Wide-screen to Cinemascope, and vice versa. A plurality of lenses associated with the various formats capable of being projected by the projector is mounted on a rotatable turret. Drive means is operable in response to the sense means for driving the turret from a first to a second angular position in accordance with the change of format.

One feature of the present invention resides in the provision of variable projection aperture means connected to the turret to alter the size of the projection aperture upon a change of position of the turret between its first and its second angular positions.

In accordance with another feature of the present invention, the sense means includes a strip of reflectable material positioned on the film at the junction of different film formats, and means is provided for detecting the strip.

In accordance with yet another feature of the present invention, means is provided for manually operating the motor to rotate the turret and change the frame aperture size.

The above and other features of this invention will be more fully understood from the following detailed description and the accompanying drawings, in which:

FIG. 4 is a frontal view of a turret assembly for the apparatus shown in FIGS. 1–3;

FIG. 5 is a side view, partly in cutaway cross-section, of a motor assembly for the turret assembly shown in FIGS. 1–4;

FIG. 6 is a block-circuit diagram of certain electrical and mechanical apparatus for the apparatus shown in FIGS. 1–3;

FIG. 8 is a plan view of the adjustable projection apparatus shown in FIG. 7 in a second aperture position;

Figure 7:
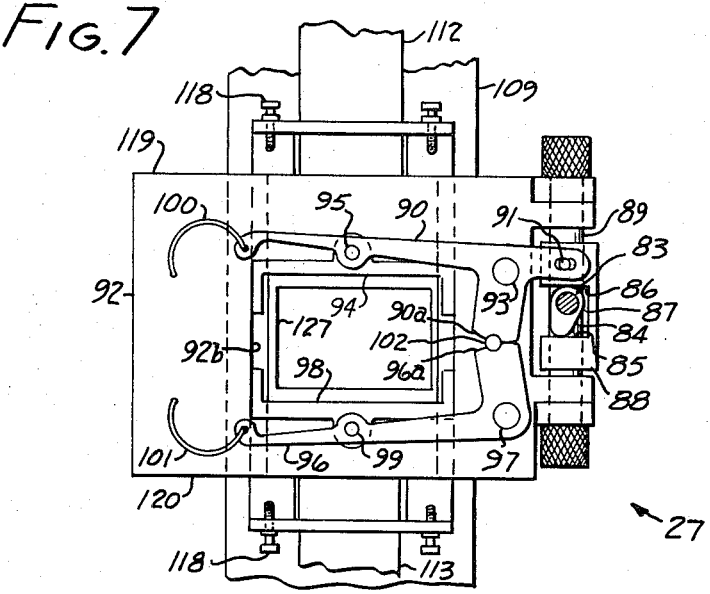
FIG. 7 is a plan view of an adjustable projection aperture assembly for the apparatus shown in FIGS. 1–3.

FIG. 9 is a rear view of the adjustable projection apparatus shown in FIGS. 7 and 8; and FIGS. 10 and 11 are section views taken at lines 10—10, and 11—11, respectively in FIG. 8.

Figure 1:
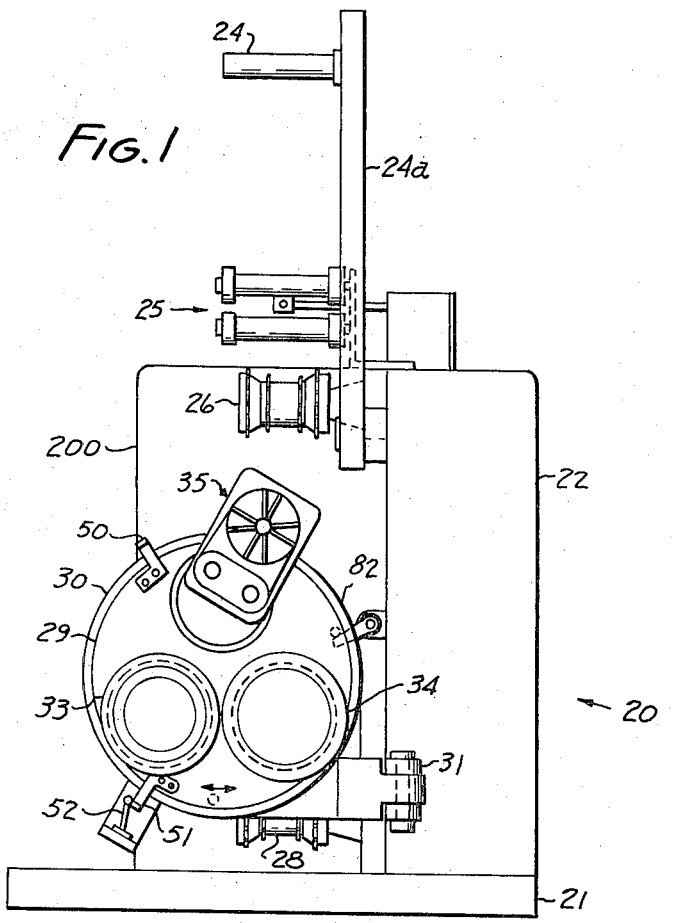
FIG. 1 is a front view of a film projector having improvements in accordance with the presently preferred embodiment of the present invention.
Figure 3:
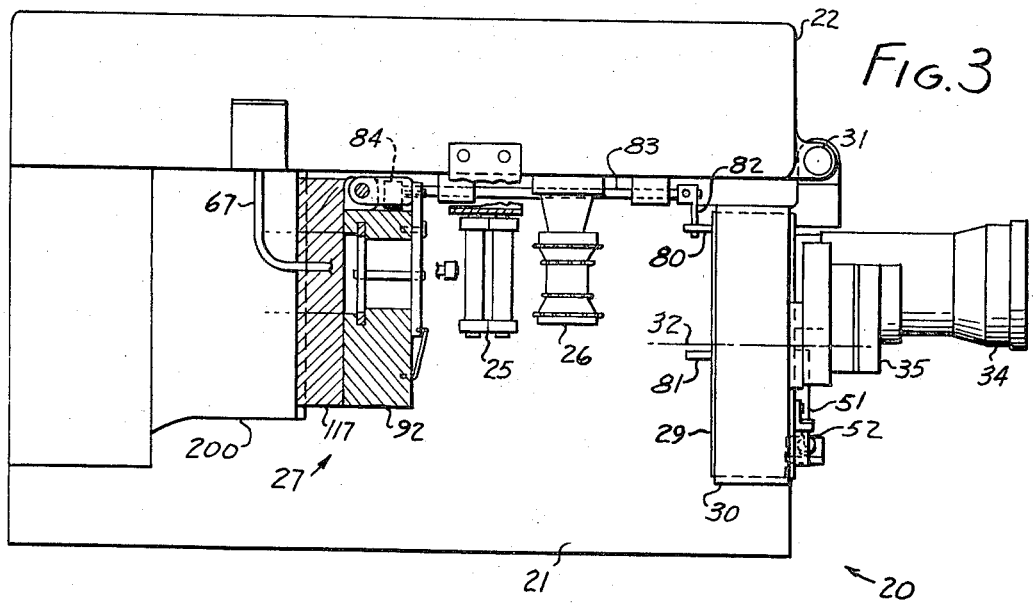
FIG. 3 is a top view of the apparatus shown in FIGS. 1 and 2.
Figure 2:
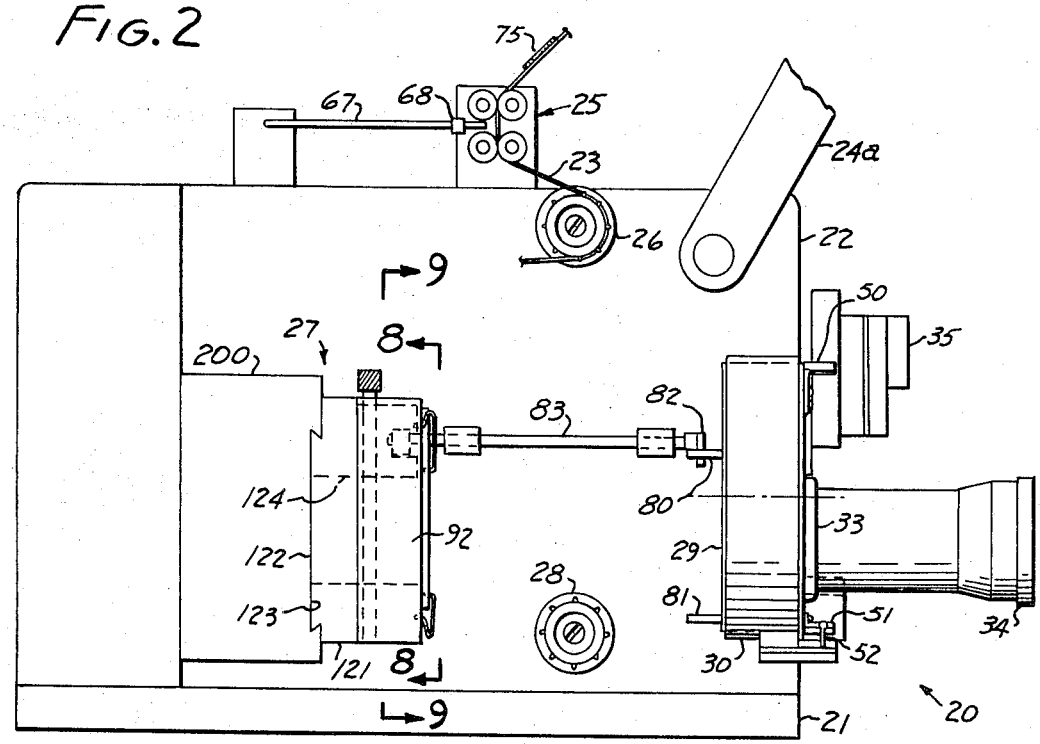
FIG. 2 is a side view of the apparatus shown in FIG. 1.

Referring to the drawings, and particularly to FIGS. 1–3, there is illustrated a film projector 20 in accordance with the presently preferred embodiment of the invention. Projector 20 includes a support base 21 supporting a housing 22 which contains the drive mechanisms for feeding film 23 through the projector, as well as the operating circuits for operating the projector lamp. A supply reel (not shown) may be secured to shaft 24 protruding from arm 24a to supply film 23 through roller assembly 25, sprocket 26, film gate 27, sprocket 28, to a suitable take-up reel (not shown). Sprockets 26 and 28 include teeth adapted to engage suitable perforations in the film to feed the film through the film gate generally illustrated at 27. The film gate is mounted to housing 200 which contains the standard shutter and projector lamp apparatus.

Turret 29 is journaled to turret housing 30, which in turn is hingedly attached to housing 22 by hinge 31. Turret 29 is adapted to rotate about axis 32 of turret 29 and housing 30. Lenses 33 and 34 are fixedly attached to turret 29. For example, lens 33 may be a standard "Wide-screen" lens capable of projecting an image whose width-to-height ratio is 1.85 to 1, while lens 34 may be a lens suitable for projection of "Cinemascope" images whose width-to-height ratio is 2.35 to 1. (Cinemascope images are anamorphically reduced in width by a 2 to 1 ratio to about 1.175 to 1 frame size width-to-height ratio on the film. Lens 34 anomorphically expands the image to the 2.35 to 1 image ratio.)

Motor assembly 35 is also fixedly attached to turret 29. As shown particularly in FIGS. 4 and 5, motor assembly 35 includes A-C motor 36 attached to plate 37 which in turn is attached to cylindrical housing 38 mounted in aperture 39 of turret 29. Motor 36 includes a gear 40 engaged to gear 41 which in turn is engaged to gear 42. Gear 42 is mounted to shaft 43 journaled to housing 38, and shaft 43 carries gear 44. Gear 44 is positioned in slot 45 of turret housing 29 to engage internal gear 46 mounted to the inside of turret housing 29. It is evident that upon operation of motor 36, gear 44 which is engaged to gear 46 drives turret 29 about its axis to thereby rotate the turret. As will be more fully understood hereinafter, motor 36 is operable in either of two directions to thereby rotate turret 29 about its axis in either the clockwise or counter-clockwise direction. Trips 50 and 51 are attached to turret 29 and are adapted to operate switch 52 mounted to turret housing 30. Switch 52 controls the direction of rotation of motor 36.

With reference to FIG. 6, which is a mechanical and electrical schematic block diagram illustrating the apparatus for operating motor 36 to rotate turret 29, there is illustrated a motor winding 53 having its opposite ends connected to contacts 54 and 55. Preferably, capacitor 53a is connected across winding 53. The pole of switch 52, which is adapted to engage one or the other of contacts 54 and 55, is connected via lead 56 to one side of source 57 of alternating current. The center tap of winding 53 is connected to contact 58 which forms one side of a switch, the opposite side of which is formed by contact 59 connected to the opposite side of source 57. Terminal 59 is also connected to the coil of solenoid 60 whose opposite side is connected to terminal 61 of switch 62. The movable contact of switch 62 is connected to lead 56 and is operable under the influence of solenoid winding 63, which in turn is connected to the output of pulse generator 64. Pulse generator 64 receives an input from photo responsive diode 65.

Lamp 66 is operable from a suitable source of power, such as source 57. Optical transmission fiber 67 is adapted to transmit light from lamp 66 to project a beam of light onto film 23 adjacent roller assembly 25. By way of example, optical transmission fiber 67 may comprise a suitable fiber encased in a sheath and positioned by housing 68 to direct a spot of light onto film 23 (see FIG. 2). Optical transmission fiber 67 also includes a portion 68 to transmit light to photo responsive diode 65.

Movable contact 58 is connected to the armature 69 of solenoid winding 60. Armature 69 is pivotly mounted to turret housing 30 by pin 70. Armature 69 also includes arm 71 adapted to engage one of slots 72 and 73 in the surface of turret 29. Preferably, manually operable push-button 74 is attached to armature 69 to permit manual pivoting of armature 69 about pin 70. Bias spring 76 urges arm 71 into slot 72 or 73 as shown in FIG. 6. As shown in FIGS. 2 and 6, film 23 includes a suitable reflector strip 75 positioned at the junction between two classes of program material, such as between program material having the frame characteristics of "Cinemascope" and program material having the frame characteristics of "Wide-screen."

In the operation of the apparatus thus far described, when a transition of one class of film format to another is passed through roller assembly 25, reflector strip 75 will pass into the beam of light transmitted by fiber 67 from lamp 66. The light reflected by reflector strip 75 is transmitted through fiber 68 to impinge on photo responsive diode 65. Diode 65 operates pulse generator 64 to operate solenoid winding 63 to thereby close switch contact 62 to contact 61. Thus, current from source 57 operates solenoid winding 60 to operate armature 69, thereby urging arm 71 from slot 72, thereby unlocking the turret from housing 30 and closing switch contacts 58 and 59. Upon closure of contacts 58 and 59, power is supplied to one side of motor winding 53 through one or the other of terminals 54 and 55.

Thus, one side of motor winding 53 is energized to operate the motor in one direction thereby rotating the turret. As the turret rotates, arm 71 of armature 69, not being engaged to either slot 72 or 73, biases armature 69 to maintain contacts 58 and 59 closed. The motor continues to operate until arm 71 reaches the next slot 73, at which time spring 76 urges arm 71 into the slot and armature 69 opens contact between contacts 58 and 59 thereby removing power from the motor.

Trips 50 and 51 are synchronized to the location of slots 72 and 73 so that simultaneously with the locking of arm 71 into a slot 72 or 73, a respective trip 50 or 51 trips switch 52 to the opposite contact so that upon re-energization of motor 36, such as would occur upon sensing another reflector strip 75 on the film, the motor will operate in the opposite direction.

With reference to FIGS. 2 and 3, trips 80 and 81 are attached to turret 29 on the opposite side from trips 50 and 51. As will be more fully understood hereinafter, the location of trips 80 and 81 are synchronized with the location of trips 50 and 51 and to the location of slots 72 and 73. Trips 80 and 81 are adapted to trip lever 82 attached to shaft 83 journaled to housing 22. The opposite end of shaft 83 includes lever cam 84, shown in greater detail in FIGS. 7–8. Lever cam 84 is adapted to engage one of opposite surfaces 85 and 86 of slot 87 in housing 88. Housing 88 is journaled to shaft 89 to reciprocate along the axis of the shaft. Lever 90 is loosely coupled to housing 88 by pin 91 and is pivotly mounted to housing 92 by pin 93. Plate 94 is coupled to arm 90 by pin 95. Likewise, arm 96 is pivotly mounted to housing 92 by pin 97 and is coupled to plate 98 by pin 99. The opposite ends of arms 90 and 96 are biased to first and second positions by bias springs 100 and 101, respectively. Drive pin 102 engages arms 90 and 96 so that upon pivotal rotation of arm 90, cam surface 90a bears against pin 102 and cam surface 96a to pivotly rotate arm 96 in the opposite direction.

As shown in FIGS. 7–11, plates 94 and 98 are substantially planar plates having planar bodies 103 and depending portions 104 extending downwardly and slightly inwardly from bodies 103 as shown in FIGS. 7, 8 and 10. Arms 105 extend in substantially the same plane as planar body 103 so that body 103 and arms 105 ride in slot 106 of plate 92. Slot 106 is defined by side walls 107 and 108 and extend to edge surfaces 119 and 120 of plate 92. Retainer plate 109 (FIGS. 7 and 8) is fastened to the rear of housing 92 in slot 110 by means of fasteners (not shown) attached to fastener receptacles 111. Plate 109 also carries suitable guide rollers (not shown) for guiding film through the film gate, and suitable pressure pad assemblies, shown generally at 112 and 113 for bearing against the film. Slot 106 is recessed in the rear side of plate 94 from slot 110 so that plate 109 is fastened to housing 92 over the planar surfaces of plates 94 and 98 so that plates 94 and 98 are slidably reciprocate between two positions in slot 106. Pins 95 and 99, attached to arms 90 and 96, extend through recessed portions 92a of plate 92 to engage plates 94 and 98. A large window aperture 92b is formed through plate 92. As will be more fully understood hereinafter, aperture 92b is larger than the intended projection aperture for either Wide-screen or Cinemascope material.

Plates 94 and 98 include arms 114 and 115, respectively, which extend outwardly from housing 92 from slot 106. Cross arms 116 and 117 extend forwardly (as viewed in FIGS. 7 and 8) and carry fasteners 118, the ends of which are adapted to bear against surfaces 119 and 120 of housing 92 when the assembly is in the position shown in FIGS. 8-10. Fasteners 118 are adjustable with respect to the respective cross-arm 116 and 117 to adjustably position the location of plates 94 and 98 when the apparatus is in the position illustrated in FIGS. 8-10.

Housing 121 is hingedly attached to shaft 89 and carries suitable film guides (not shown) for guiding film 23 past pressure pad assemblies 112 and 113. Assemblies 112 and 113 carry suitable spring-loaded pressure pads 113a shown in FIG. 10, adapted to bear against film in slot 128 between housings 92 and 121 (FIG. 10). As shown particularly in FIG. 2, housing 21 includes dove-tail 122 adapted to engage dove-tail slot 124 of housing 200. An aperture, shown generally at 124 in FIG. 2 provides projection of light from the projector lamp in housing 200 through aperture 124, the apertures in housing 92 to project through the appropriate lens carried by turret 29. Housing 121 also carries removable aperture plate 125 and keeper 126 (FIG. 10). Plate 125 includes a fixed projection aperture 127, suitable for the largest aperture required for the particular film format. For example, aperture plate 125 may be a standard aperture plate suitable for Cinemascope projection.

The apparatus illustrated generally as housing 121, together with the attendant guides, aperture plate and keeper, are commercially available from Westrex Company, Ltd. of London, Eng. as Westrex part number 2187. The apparatus illustrated generally as retainer plate 109 and pressure pad assemblies 112 and 113 are also commercially available from Westrex Company, Ltd. as Westrex Part Numbers LSD-84255 and LSD-42137, respectively. These commercially available parts are utilized on the Series 5000 film projectors manufactured by Westrex Company, Ltd.

In the use of the adjustable projection aperture apparatus according to the present invention, housing 92 is closed against housing 121 as illustrated in FIG. 2 and is secured by lock means (not shown). Film to be projected is laced through slot 128 between the pressure pads carried by housing 92 and the guides carried by housing 121. With the projector lamp operated, light from the lamp projects through aperture 127 in aperture plate 125, through the space between opposite plates 94 and 98, and through the lens aligned with the film gate for projection onto a projection screen (not shown) positioned forwardly of the projector apparatus (to the right of FIGS. 2 and 3).

The width of the projection aperture formed in film gate 27, as viewed in FIGS. 7-9, is determined solely by the width of aperture 127 in plate 125. The height of the projection aperture, as viewed in FIGS. 7-10, is determined by the position of plates 94 and 98. When plates 94 and 98 are in the position shown in FIG. 7, portions 104 of the plates are retracted out of the line-of-sight of aperture 127 in plate 125. Hence, the height of the projection aperture is determined by the height of aperture 127 in plate 125. When plates 94 and 98 are in the position shown in FIGS. 8-10, portions 104 of plates 94 and 98 extend into the line-of-sight of aperture 127. Hence, the height of the projection aperture of film gate 27 is determined by the space between the closest edges of portions 104 of plates 94 and 98. The location of the position of plates 94 and 98 when in the condition illustrated in FIGS. 8-10 may be adjusted by adjusting fasteners 118, thereby adjusting the orientation of a plate 94 and 98 with respect to housing 92. Thus, with particular reference to FIG. 10, the projection aperture size is variable between two sizes; one size wherein the height of the aperture is determined by the height of aperture 127 (shown as dimension 129 in FIG. 10) and a second size wherein the height of the aperture is determined by the space between portions 104 of plates 94 and 98 (shown as dimension 130 in FIG. 10).

When it is desirable to change from one aperture size to another, turret 29 is rotated so that one or the other of trips 80 and 81 operate cam 82 to rotate shaft 83. The rotation of shaft 83 operates cam 84 to bear against one or the other of surfaces 85 and 86 on housing 88, thereby pivoting arm 90 about pin 93. As arm 90 rotates, cam surface 90a bears against cam surface 96a to cause an opposite pivotal movement of arm 96. Pin 102 engaged to arms 90 and 92 assures movement of both arms. Rotation of arms 90 and 96 about their respective pivot points cause plates 94 and 98 to reciprocate in opposite directions in slot 106, thereby selectively enlarging or reducing the height of the frame aperture between two preselected sizes. Thus, arms 90 and 96 are pivotable between two positions to define first and second positions for plates 94 and 98. Springs 100 and 101 urge arms 90 and 96 to their respective first and second positions as determined by cam 84.

Thus, when turret 29 is rotated by motor 36, as would be occasioned by the sensing of a reflectable strip 75 on film 23 located at the junction between two classes of program material, turret 29 rotates to position the proper lens 33 or 34 in the optical path of the projector lamp and frame aperture. At the same time, trips 80 and 81 operate the variable frame aperture mechanism illustrated in FIGS. 7-11 to alter the aperture size to be compatible with the frame characteristics of the program material to be projected. Preferably, switch means (not shown) is responsive to the rotation of shaft 82 to inhibit operation of the projection lamp during the change of frame size and lens, such as by closing a shutter in housing 200.

The present invention thus provides automatic lens changing apparatus for changing the lens and projection aperture of a projector for various classes of film format. The projection aperture size is automatically adjusted to be compatible with the frame size of the film format and the lens on the turret. The apparatus is effective in operation, and enables a change of lens and projection aperture to be accomplished automatically upon a change of class of film format, without manual operation.

With projection apparatus in accordance with the present invention, it is possible to project material from films containing more than one class of film format, such as "Cinemascope" and "Wide-screen" material, without manual intervention. The apparatus senses the change of class of film format to automatically change the lens and aperture size in accordance with changed class of film format.

This invention is not to be limited by the embodiment shown in the drawings and described in the description, which is given by way of example and not of limitation, but only in accordance with the scope of the appended claims.

What is claimed is:

1. In a cinemagraphic projector for projecting images on a screen, said projector having a supply reel for containing a film having first and second classes of film format characterized by first and second frame sizes, respectively, a take-up reel for taking up film, and film gate means for transporting film past a projection lamp between said supply reel and said take-up reel, the improvement comprising: a rotatable turret positioned forwardly of said projection lamp and adapted to rotate between first and second angular positions; first and second lens means mounted to said turret and having different optical characteristics for projecting images contained in said first and said second classes of program material, respectively, said turret positioning said first lens in the optical path of said projection lamp when said turret is in its first angular position and positioning said second lens in the optical path of said projection lamp when said turret is in its second angular position; drive means connected to said turret for rotating said turret between its first and second angular positions; and sense means responsive to a change of class of film format on said film for operating said drive means; said film gate means including a single, variable aperture defining frame in the optical path between said projection lamp and said turret, said aperture defining frame being movable between a first position wherein said aperture defining frame defines a projection aperture having a first size and a second position wherein said aperture defining frame defines a projection aperture having a second size, respectively, and operating means responsive to a change in the angular position of said turret for moving said aperture defining frame between its first and second positions.

2. The apparatus according to claim 1 wherein said drive means includes a motor mounted to said turret and engaging a portion of said projector, a switch mounted to said projector for selectively operating said motor to drive said turret about its axis, first and second trip means mounted to said turret operatively engaging said variable aperture defining frame when said turret is in its first and second angular positions, and third and fourth trip means mounted to said turret for engaging said switch means when said turret is in its first and its second angular positions.

3. The apparatus according to claim 1 further including lock means for engaging said turret adapted to prevent said turret from rotation when said turret is in its first and in its second angular positions, said lock means further including switch means connected thereto for operating said drive means when said lock means is disengaged from said turret, said circuit means further including electro-mechanical means responsive to said radiation-responsive means for disengaging said lock means from said turret.

4. The apparatus according to claim 3 wherein said drive means includes a motor mounted to said turret and engaging a portion of said projector, a switch mounted to said projector for selectively operating said motor to drive said turret about its axis, first and second trip means mounted to said turret operatively engaging said variable aperture defining frame when said turret is in its first and its second angular positions, and third and fourth trip means mounted to said turret for engaging said switch means when said turret is in its first and its second angular positions.

5. Apparatus according to claim 1 wherein said aperture defining frame includes a support plate mounted to said projector, said support plate including means defining a generally rectangular aperture, first and second members slidably engaged to said support plate and movable between first and second positions wherein said members selectively block portions of said aperture to define a projection aperture whose size is compatible with the frame size of said first and second classes of film format, respectively.

6. Apparatus according to claim 5 wherein the plane of said support plate is generally perpendicular to the axis of said lenses, and wherein said operating means comprises shaft means rotatably supported by said projector, first lever means supported by said shaft means, first and second trip means mounted to said turret and adapted to engage said first lever means to rotate said shaft means about its axis, pivot means pivotly supported by said support plate and engaging said first and second members for moving said first and second members between their first and second positions, and second lever means supported by said shaft means and engaging said pivot means to pivotly move said pivot means to move said first and second members between their first and second positions upon rotation of said shaft means, whereby upon rotation of said turret between its first and second angular positions a respective one of said first and second trip means engages said first lever means to rotate said shaft means to thereby operate said pivot means to move said first and second members between their first and second positions.

7. Apparatus according to claim 6 wherein said pivot means comprises a first pivot arm engaged to said first member and pivotly mounted to said support plate and a second pivot arm engaged to said second member and pivotly mounted to said support plate, a first cam surface on said first pivot arm engaging a second cam surface on said second pivot arm, engaging means engaging said first pivot arm and said second pivot arm, and means supported by said first pivot arm engaging said second lever means.

8. Apparatus according to claim 7 further including bias means biasing said first and second pivot arms to restrain movement of said first and second members when they are in their first and second positions.

* * * * *